Jan. 31, 1967 R. L. WHITE 3,301,088

VEHICLE ADJUSTABLE CONTROL PEDAL ASSEMBLIES

Filed March 2, 1964

INVENTOR.
Robert L. White
BY
W. S. Pettigrew
ATTORNEY

United States Patent Office 3,301,088

Patented Jan. 31, 1967

1

3,301,088

VEHICLE ADJUSTABLE CONTROL PEDAL ASSEMBLIES

Robert L. White, Frankenmuth, Mich., assignor to General Motors Corporation, Detroit, Mich., a corporation of Delaware Filed Mar. 2, 1964, Ser. No. 348,679
2 Claims. (Cl. 74—560)

This invention relates to control pedals and more particularly to adjustable control pedal arrangements.

One feature of this invention is that it provides a new and improved adjustable control pedal arrangement. Another feature of this invention is that it provides a new and improved vehicle control pedal arrangement including a control member movably mounted on the vehicle body to control a mechanism to be operated, and a pedal member adjustably mounted on the control member for adjustment relative thereto and to the vehicle body. A further feature of this invention is that compact actuator means are mounted on the control member and operably connected to the pedal member so as to adjust the pedal member relative to the vehicle body. Yet another feature of this invention is that power-operated means are provided to selectively operate the actuator means.

These and other features of the invention will be readily apparent from the following specification and drawings wherein.

Figure 1:
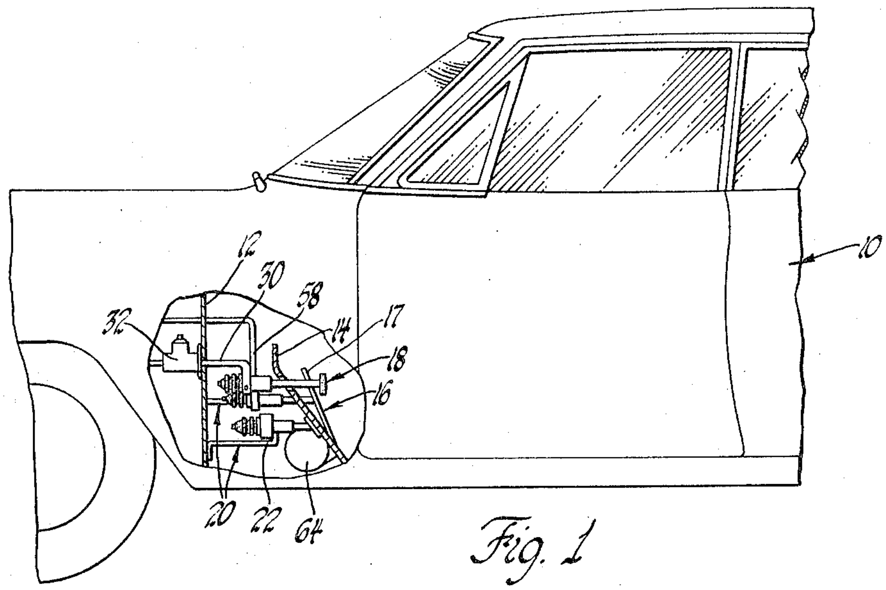
FIGURE 1 is a broken away partial elevational view of a vehicle body including an adjustable control pedal arrangement according to this invention.
Figure 3:
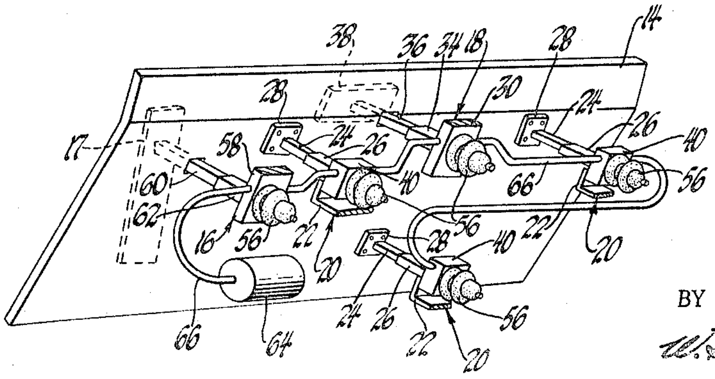
FIGURE 3 is a perspective view.

Referring now particularly to FIGURE 1 of the drawing, a vehicle body 10 includes a dash panel 12 separating the forward engine compartment from the passenger compartment. An adjustable toeboard and control pedal arrangement according to this invention is mounted on panel 12 and generally includes a toeboard 14 providing foot rest area for the passenger, an accelerator pedal assembly 16 and a brake pedal assembly 18. Referring to FIGURES 1 and 3, toeboard 14 is mounted on panel 12 by three mounting bracket assemblies 20, each of which includes a bracket 22 secured to panel 12 and a support shaft subassembly comprising inner and outer telescopically arranged members 24 and 26, each inner member 24 carrying a support plate 28 secured to toeboard 14. Each assembly 20 further includes an actuator, designated as 40 and presently to be described, for selectively telescoping members 24 within members 26 to adjust the position of toeboard 14 toward and away from panel 12.

Figure 2:
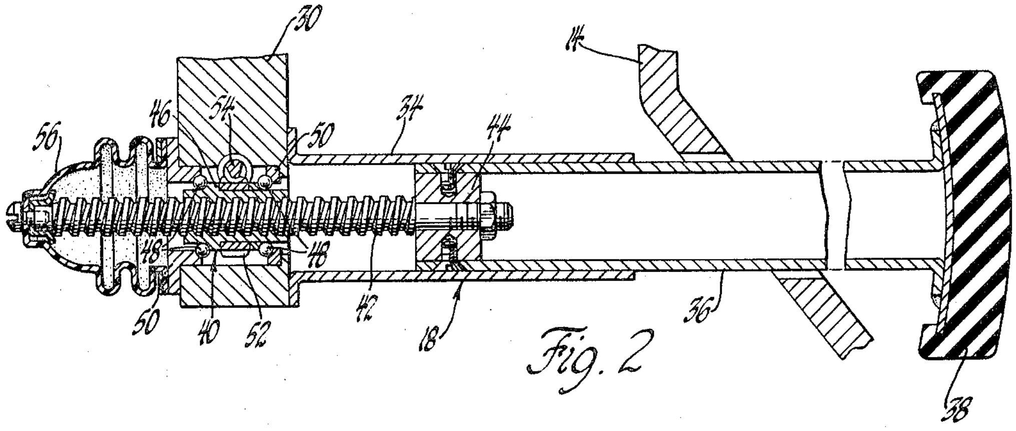
FIGURE 2 is an enlarged sectional view of a portion of FIGURE 1.

Brake pedal 18 includes a generally L-shaped control member 30 having one leg thereof mounted in a suitable manner on panel 12 for movement longitudinally of body 10 so as to control a brake mechanism 32 mounted within the engine compartment on panel 12. As shown best in FIGURE 2, the other leg of member 30 has mounted thereon a tubular support extension 34 slidably and nonrotatably receiving a tubular pedal member 36 extending through an opening in toeboard 14 and mounting a foot pad or tread 38.

Pedal member 36 is telescopically adjustable relative to control member 30 and panel 12 by a screw and nut actuator 40 mounted in the control member and having the rearward end of the screw 42 nonrotatably secured within a block 44 of the pedal member. The nut 46 of assembly 40 is rotatably mounted in control member 30 by two annular rings of ball bearings 48 engaging bearing shoulders of a pair of supporting end plates 50 of the

2 control member. A worm wheel 52 is nonrotatably secured to nut 46 and is meshingly engaged by a driving worm 54 arranged transversely of the nut. It will be apparent that nut 46 is fixed within control member 30 against axial movement and that rotation thereof caused by driving rotation of worm 54 will impart axial movement to the screw 42 so as to telescope pedal member 36 relative to extension 34. For a more particular description of this type of screw and nut actuator, reference may be had to Patent No. 2,905,012, issued September 22, 1959, to Thomas E. Lohr et al. A flexible boot 56 is secured at one end thereof to an end plate 50 and at the other end thereof to the forward end of screw 42 to conceal the screw and prevent the accumulation of dirt, etc., in the actuator 40.

The accelerator pedal assembly 16 has the treadle 17 thereof hingedly mounted in conventional manner adjacent its lower end on toeboard 14 and connected adjacent its upper end to a throttle control member 58 of the throttle linkage by telescopic inner and outer connecting members 60 and 62 similar in arrangement to that of members 34 and 36 of the brake pedal assembly. A screw and nut actuator 40, previously described, is mounted in control member 58 to telescope inner member 60 relative to outer member 62 and thereby adjust treadle 17 relative to control member 58.

As mentioned, other actuators 40 are provided in the toeboard bracket assemblies 20 to adjust the toeboard relative to panel 12. Here, the actuators are mounted on brackets 22 and have the screws thereof connected to inner members 24 for telescopic movement thereof relative to outer members 26.

Referring now to FIGURE 3, power-operated means 64 for selectively operating the several actuators 40 includes a reversible electric motor having suitable reduction gearing, and a flexible drive cable 66 connecting with the worms of all of the actuators 40. As seen in FIGURE 1, the brake pedal member 36, treadle 17 and toeboard 14 are individually mounted so as to be in desired relation with each other, and this relation is maintained during adjustment of each relative to panel 12. With the arrangement of the several actuators 40 being identical, operation of power-operated means 64 in a selected rotative direction will simultaneously telescope members 24, pedal member 36, and member 60 of the accelerator pedal to coordinatively adjust the toeboard and the pedals to a desired position.

It will be apparent that the toeboard and control pedal arrangement of this invention provides simplified means for adjusting the position of the various control pedals and the toeboard to suit the needs of an individual vehicle operator and that these means are easily adapted to adjust additional pedals, such as a clutch pedal. If it is found that the cable 66 undergoes an appreciable amount of lash between successive actuators so that the pedals and toeboard are not coordinatively adjusted in the desired manner, separate shorter cables may be provided for the individual actuators 40.

Thus a new and improved vehicle control pedal and toeboard arrangement is provided.

I claim:

1. In combination with a vehicle having a plurality of control mechanisms, a plurality of control pedal assemblies each respective to one of said control mechanisms, each said assembly including a control member associated with said respective mechanism for control thereof and a pedal member movably mounted on said control member for positional adjustment relative thereto, an actuator on each said assembly interconnecting the control member and the pedal member thereof and operable to effect the positional adjustment of the latter, actuator drive means interconnecting the several said actuators for simultaneous operation thereof to positionally adjust said pedal members in unison relative to their respective control members, and power-operated means for driving said drive means.

2. The combination of claim 1 wherein the control member and the pedal member of each said assembly are telescopically related, each said actuator including a nut rotatably mounted on a control member and a screw non-rotatably mounted on the respective pedal member, said drive means interconnecting the several said nuts for simultaneous rotation thereof.

References Cited by the Examiner

UNITED STATES PATENTS

| | | | |
|---|---|---|---|
| 155,823 | 10/1874 | Blake | 74—560 X |
| 2,905,012 | 9/1959 | Lohr et al. | 74—424.8 |
| 3,088,331 | 5/1963 | Bachman | 74—560 X |
| 3,151,499 | 10/1964 | Roe | 74—560 |

FOREIGN PATENTS

| | | |
|---|---|---|
| 13,483 | 1901 | Great Britain. |

FRED C. MATTERN, Jr., *Primary Examiner.*

C. F. GREEN, *Assistant Examiner.*